(12) United States Patent
Fenech et al.

(10) Patent No.: US 8,594,661 B2
(45) Date of Patent: Nov. 26, 2013

(54) METHOD FOR ESTABLISHING RADIOFREQUENCY LINKS VIA A MULTISPOT SATELLITE

(75) Inventors: Hector Fenech, Issy les Moulineaux (FR); Emmanuel Lance, Clichy (FR); Jacques Dutronc, Versailles (FR)

(73) Assignee: Eutelsat SA, Paris (FR)

(*) Notice: Subject to any disclaimer, the term of this patent is extended or adjusted under 35 U.S.C. 154(b) by 1356 days.

(21) Appl. No.: 12/082,985

(22) Filed: Apr. 16, 2008

(65) Prior Publication Data
US 2009/0227252 A1 Sep. 10, 2009

(30) Foreign Application Priority Data

Mar. 5, 2008 (FR) ...................................... 08 51432

(51) Int. Cl.
*H04W 4/00* (2009.01)
*H04W 40/00* (2009.01)

(52) U.S. Cl.
USPC .......... 455/429; 455/3.02; 455/427; 455/428; 455/430

(58) Field of Classification Search
USPC .................................... 455/427, 428, 429, 430
See application file for complete search history.

(56) References Cited

U.S. PATENT DOCUMENTS

| | | | |
|---|---|---|---|
| 5,083,131 A | 1/1992 | Julian | 342/372 |
| 5,570,343 A * | 10/1996 | Bishop et al. | 370/216 |
| 6,288,673 B1 | 9/2001 | Dolmeta et al. | 342/374 |
| 6,973,287 B2 * | 12/2005 | Franzen et al. | 455/12.1 |
| 7,020,462 B1 * | 3/2006 | Wesel | 455/427 |
| 2004/0132448 A1 * | 7/2004 | Torres et al. | 455/427 |
| 2006/0079246 A1 * | 4/2006 | Cho | 455/456.1 |
| 2007/0077884 A1 * | 4/2007 | Regulinski et al. | 455/12.1 |
| 2007/0117509 A1 * | 5/2007 | Wang | 455/12.1 |
| 2008/0146145 A1 * | 6/2008 | Pateros et al. | 455/12.1 |
| 2009/0219810 A1 * | 9/2009 | Polette et al. | 370/229 |
| 2009/0239529 A1 * | 9/2009 | Fenech et al. | 455/427 |
| 2013/0035033 A1 * | 2/2013 | Sanneck et al. | 455/9 |

FOREIGN PATENT DOCUMENTS

| | | |
|---|---|---|
| EP | 0812072 | 12/1997 |
| EP | 1168672 | 6/2000 |
| FR | 2762937 | 5/1997 |
| GB | 2303764 | 2/1997 |

* cited by examiner

*Primary Examiner* — Wesley Kim
(74) *Attorney, Agent, or Firm* — Davidson, Davidson & Kappel, LLC

(57) ABSTRACT

A method for establishing radiofrequency links via a telecommunication satellite having several spots, designated a multispot satellite, between at least one terrestrial station and a service area composed of a plurality of elementary covering zones, designated cells, each cell comprising a plurality of terrestrial terminals is disclosed. This type of satellite allows the use of several spots of antennae on board the satellite to cover contiguous geographical zones or cells, instead of a single broad spot. Each cell is associated with a spot to which a frequency band is attributed. In the case of the loss of a spot associated with a cell, designated a faulty cell, the spot (FR1, FR2, FB1, FB2, FV1, FV2) associated with at least one contiguous cell (CR1, CR2, CB1, CB2, CV1, CV2) to the said faulty cell is likewise associated with a part of the said faulty cell so that the area (CPJ') of said faulty cell is reduced.

13 Claims, 6 Drawing Sheets

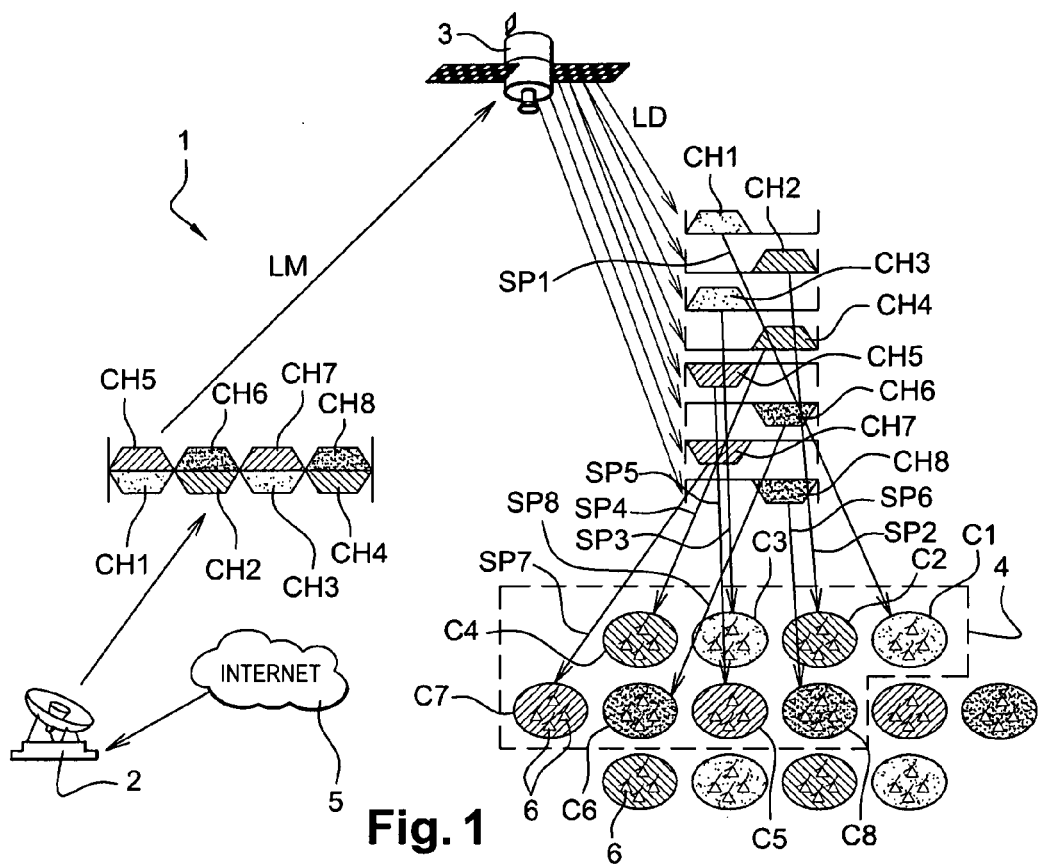
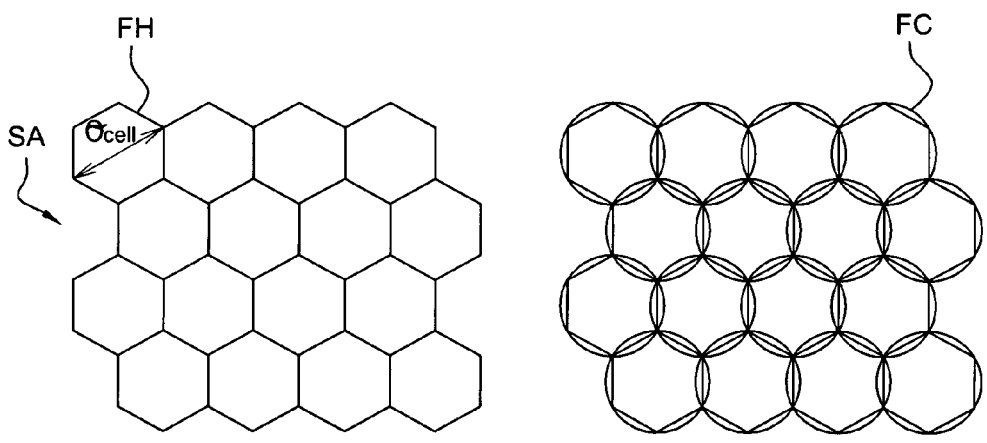
Fig. 1
Fig. 2

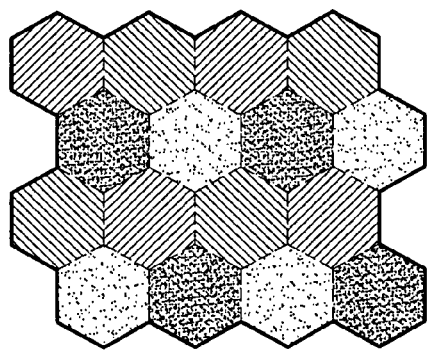
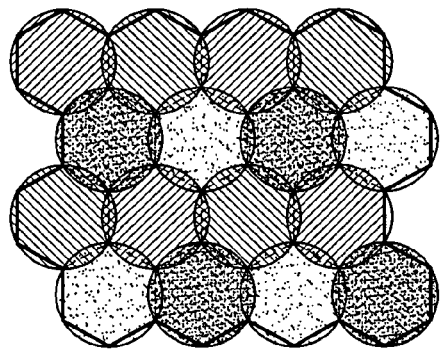
Fig. 3a  Fig. 3b
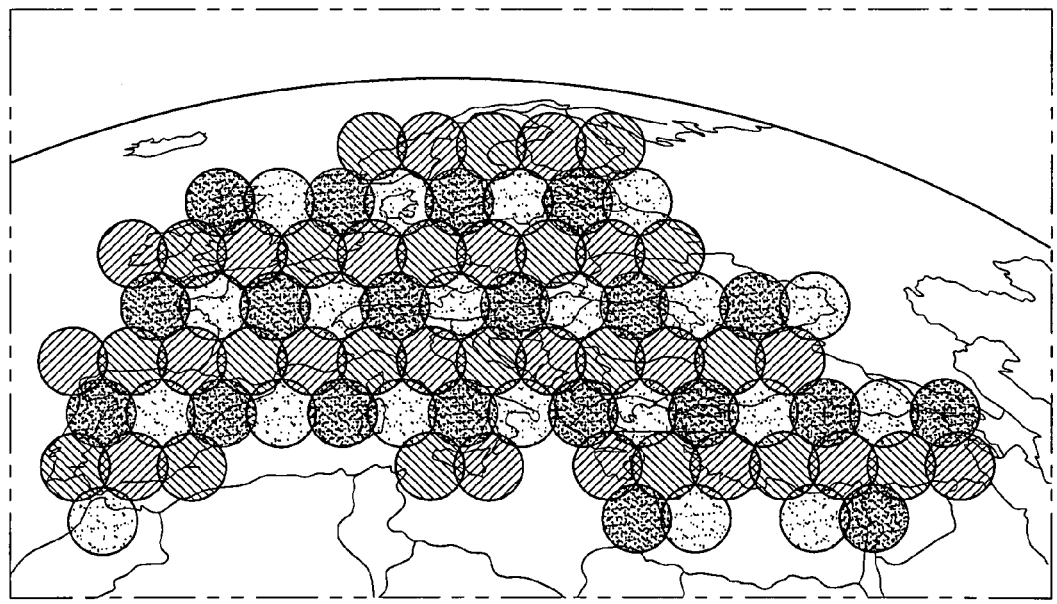
Fig. 4

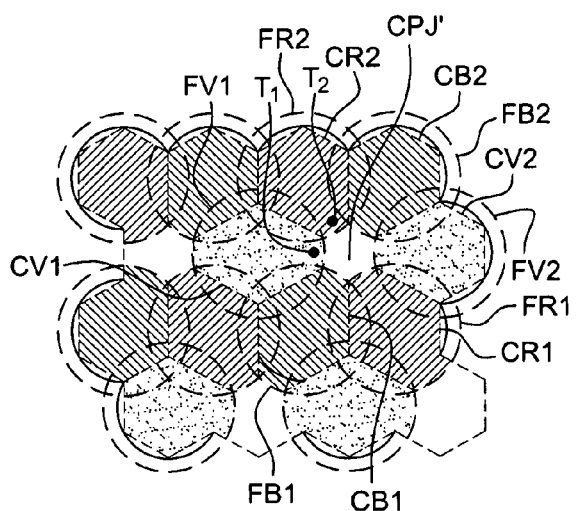
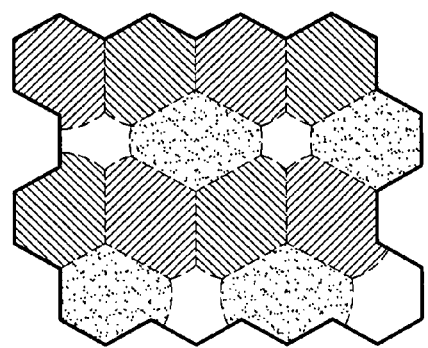
Fig. 9a          Fig. 9b
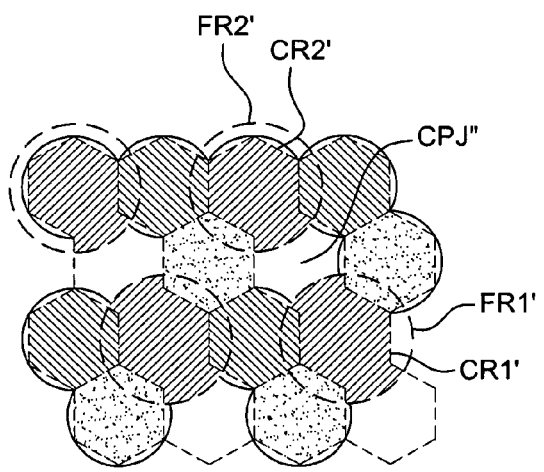
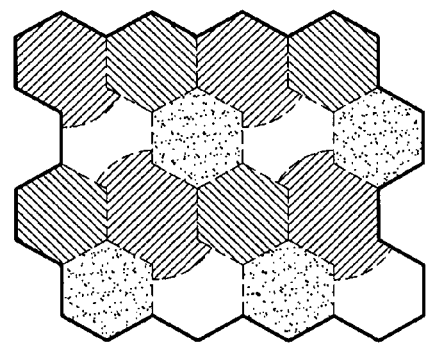
Fig. 10a          Fig. 10b

METHOD FOR ESTABLISHING RADIOFREQUENCY LINKS VIA A MULTISPOT SATELLITE

This claims priority to French Patent Application FR 08/51432, filed Mar. 5, 2008, the entire disclosure of which is incorporated by reference herein.

BACKGROUND

The present invention concerns a method for establishing radiofrequency links via a telecommunication satellite having several spots, designated multispot satellite, between at least one terrestrial station (designated as gateway) and a service area composed of a plurality of elementary covering zones, designated as cells, each cell comprising a plurality of terrestrial terminals. This type of satellite allows the use of several antenna spots on board the satellite to cover contiguous geographical zones or cells, instead of a single broad spot.

Such multispot satellites allow several radiofrequency links to be established occupying the same frequency band on different spots.

In the case of a broadband satellite telecommunication system, the satellite is used in a bidirectional manner, i.e. at the same time for:
  relaying data emitted by a terrestrial station towards a plurality of terrestrial terminals: this first link of the point-multipoint type constitutes the forward link;
  relaying towards the terrestrial station the data emitted by the terrestrial terminals this second link, of the multipoint-point type, constitutes the return link.

It will be noted that a radiodiffusion service by satellite can be considered as equivalent to the forward link of a bidirectional system such as described above.

An example of forward link in a multispot configuration is illustrated in FIG. 1.

Signals are sent towards a multispot satellite 3 on an uplink LM by a terrestrial station 2 such as a gateway connected to an internet backbone 5. These signals are then processed at the level of the satellite 3 then retransmitted on a downlink LD in the form of a plurality of spots forming elementary covering zones or cells C1 to C8 in which terrestrial terminals 6 are situated. Each cell C1 to C8 is associated with a spot SP1 to SP8. It will be noted that in the case of configuration 1, the eight cells C1 to C8 associated respectively to the eight spots SP1 to SP8 form a group of cells served by the same terrestrial station 2. The return link of the terrestrial terminals 6 towards the terrestrial station 2 functions in an identical manner with an inverse direction of communication.

The coordination of the frequencies between operators is carried out within the framework of a regulation decreed by the International Union of Telecommunications (IUT): thus, by way of example, the Ka band for Region 1 (Europe, Africa, Middle East) is defined in Table 1 below:

TABLE 1

| | | |
|---|---|---|
| Forward link | Uplink (of the terrestrial station) | 27.5 GHz to 29.5 GHz |
| | Downlink (towards the terrestrial terminals) | 19.7 GHz to 20.2 GHz |
| Return link | Uplink (of the terrestrial terminals) | 29.5 GHz to 30.0 GHz |
| | Downlink (towards the terrestrial station) | 17.7 GHz to 19.7 GHz |

Other bands such as band Ku can likewise be used.

Given that the gain of an antenna is inversely proportional to the opening of the spot, it is necessary to use multispot antennae to cover an extensive zone with a homogeneous and high gain. The greater number of spots, the smaller the opening of each spot will be. Thus, the gain on each spot and hence the gain on the service area to be covered will be increased. As we have mentioned above, a service area to be covered is formed by a plurality of contiguous cells (elementary covering zones), a spot being associated with each cell. A homogeneous multispot covering zone SA is represented in FIG. 2a), each cell being represented by a hexagon FH such that the covering zone is composed of a plurality of hexagons FH in which $\phi_{cell}$ is the external dimension of the cell expressed by the angle of the satellite associated with the covering. However, the antenna spot associated with each cell is not capable of producing a hexagonal shape, a good approximation consisting in considering a plurality of circular spots FC such as represented in FIG. 2 b). The association of a spot with a cell is carried out taking into account the best performances of the satellite for said spot, in particular in terms of EIRP (Effective Isotropic Radiated Power) and of merit factor G/T (ratio gain over noise temperature): a cell is determined as the part of the service area associated with the spot offering the highest gain on this zone from all the spots of the satellite.

Configuration 1, as represented in FIG. 1, uses a technique designated frequency re-use: this technique allows the same range of frequencies to be used several times in the same satellite system so as to increase the total capacity of the system without increasing the attributed band pass.

Frequency re-use schemes are known, designated as color schemes, making a color correspond to each of the spots of the satellite. These color schemes are used to describe the attribution of a plurality of frequency bands to the spots of the satellite with a view to radiofrequency transmissions to be realized in each of these spots. In these schemes, each color corresponds to one of these frequency bands.

In addition, these multispot satellites allow polarised transmissions to be emitted (and received): the polarisation can be linear (in this case the two directions of polarisation are respectively horizontal and vertical) or circular (in this case the two directions of polarisation are respectively circular left or circular right). It will be noted that in the example of FIG. 1, the uplink leaving the station 2 uses two polarisations with four channels for each polarisation, respectively Ch1 to Ch4 for the first polarisation and Ch5 to Ch8 for the second polarisation: the use of two polarisations allows the total number of terrestrial stations to be reduced. The eight channels Ch1 to Ch8, after processing by the payload of the satellite 3 will form the eight spots SP1 to SP8 (one channel being associated with one spot in this example).

According to a scheme with four colors (red, yellow, blue, green) with a frequency spectrum of 500 MHz for each polarisation, the transmissions being polarised in one of the two polarisation directions: circular right or circular left, each color is associated with a band of 250 MHz and a polarisation direction.

In the whole of the following description, we will take the following convention:
  the color red is represented by hatched lines toward the right;
  the color yellow is represented by dense points;
  the color blue is represented by hatched lines toward the left;
  the color green is represented by dispersed points.

A color is thus associated with each spot of the satellite (and hence a cell) so that the spots of a same "color" are non-adjacent: the contiguous cells therefore correspond to different colors.

FIGS. 3a) and 3b) take up again the example of FIGS. 2a) and 2b) with a scheme having four colors. FIG. 3a) illustrates a homogeneous multispot covering zone, each cell being represented by a hexagon associated with a color so that the contiguous cells therefore correspond to different colors. FIG. 3b) represents the circular spots associated with each cell (the color of which is identical to that of the associated cell).

An example of a scheme with four colors for the coverage of Europe is represented in FIG. 4. In this case, 80 cells are necessary to cover Europe. This scheme allows there to be a European coverage towards and from terminals using a spectrum of 500 MHz but with the re-use of the frequencies. The coverage for the terrestrial stations is less constraining and can be provided by a sub-assembly of spots or a separate coverage.

This type of scheme is equally applicable in uplink and in downlink. At the satellite level, the creation of a spot is made from a horn radiating towards a reflector. A reflector can be associated with a color so that a coverage with four colors is ensured by four reflectors.

FIG. 5 illustrates a frequency plan broken down into an uplink frequency plan PMVA on the forward link, a downlink frequency plan PDVA on the forward link, an uplink frequency plan PMVR on the return link and a downlink frequency plan PDVR on the return link. The notations RHC and LHC designate respectively the right and left circular directions of polarisation.

The PMVA plan corresponding to the uplink on the forward link (of the terrestrial station to the satellite) has 2 GHz available frequency spectrum so that 16 channels of 250 MHz band pass are generated by a terrestrial station (8 channels for each polarisation). These 16 channels, after processing by the payload of the satellite will form 16 spots. In this example, 16 spots (and hence 16 cells) are generated by a terrestrial station.

It will be noted that the scheme with four colors, for the forward link, associates one of the following four colors with each spot of a pattern of four adjacent spots:
- a first color red corresponding to a first band of 250 MHz (lower part of the available spectrum of 500 MHz) and to the circular right polarisation direction;
- a second color blue corresponding to the same first band of 250 MHz and to the circular left polarisation direction;
- a third color yellow corresponding to a second band of 250 MHz (upper part of the available spectrum of 500 MHz) and to the circular right polarisation direction;
- a fourth color green corresponding to the same second band of 250 MHz and to the circular left polarisation direction.

On the return link, the polarisations are inverted so that the colors red and yellow have a circular left polarisation and the colors blue and green have a circular right polarisation.

However, such a configuration is liable to involve certain difficulties.

SUMMARY OF THE INVENTION

In fact, the least failure involving the loss of spots has a direct impact on the cells associated with these spots, the coverage of which is no longer guaranteed. Such a failure may be due for example to:
- the failure of a terrestrial station implicating the loss of all of the spots generated from the station (in our above example 16 spots);
- the breakdown of an antenna on board the satellite (therefore generally 25% of the spots are lost originating from the satellite with four antennae on the satellite and hence 25% of the area covered by the satellite);
- the poor functioning of a multiplexer or a filter which will involve the loss of the spots directly in correspondence;
- the failure of a high power amplifier HPA generally formed by a channel amplifier CAMP and a travelling wave tube amplifier TWTA, or the partial failure of the power system on the satellite: the loss can be from one to several spots; thus, a spot will be lost if this spot is generated by a single amplifier and this amplifier (and its redundant amplifier) is lost; two spots (or more generally N spots) will be lost if the amplifier (and its redundancy) is used by two (more generally N) spots (i.e. two spots per tube or more generally N spots per tube); even four spots can be lost if the loss of the supply system is concerned, taken in common by two amplifiers (electronic power conditioner double), which are themselves used to generate two spots each.

FIG. 7 illustrates this phenomenon in the case of failure of a terrestrial station (or gateway) serving 16 spots for the coverage of the Europe zone as represented in FIG. 4. The loss of the station corresponds to the loss of a fifth (loss of 16 beams out of 80) of the global coverage, the commercial impact of such an alteration to the coverage being, of course, considerable. FIG. 8 represents an enlargement of this same zone at the level of Great Britain: it is found that the highly populated zone around London is no longer covered.

It is an object of the present invention to provide a method for establishing radiofrequency links via a multiport satellite between at least one terrestrial station and a service area composed of a plurality of cells, said method allowing the coverage to be improved in the case of the loss of one or a plurality of spots.

To this end, the invention proposes a method for establishing radiofrequency links via a telecommunication satellite with several spots, designated a multispot satellite, between at least one terrestrial station and a service area composed of a plurality of elementary covering zones, designated as cells, each cell comprising a plurality of terrestrial terminals and being associated with a spot to which a frequency band is attributed, said method being characterised in that in the case of loss of a spot associated with a cell, designated a faulty cell, the spot associated with at least one cell contiguous to said faulty cell is likewise associated with a part of said faulty cell.

Due to the invention, at least one cell contiguous to the faulty cell is "enlarged"; in other words, the spot associated with this contiguous cell is used to cover a part of the area of the faulty cell, using the performance of the spot outside its own cell. In the case where the reference cell in which a terrestrial terminal is situated can no longer function, it is in fact possible to re-attach this terminal to another spot by "extending" the cell associated with this spot. Thus, a part of the terrestrial terminals belonging initially to the faulty cell is to be found in an "enlarged" contiguous cell, the associated spot of which covers not only the contiguous cell but also a part of the faulty cell. Of course, the gain of this new spot is less than that of the lost reference spot, the G/T and the EIRP of the satellite offered by the new spot being less, but the method according to the invention offers an emergency solution in downgraded mode limiting the loss of coverage of the service area due to the lost spot. It will be noted that the spot covers not only the cell with which it is initially associated but also the part of the faulty cell without modification of the size of said spot: it is in fact the size of the contiguous cell which is increased via the partial association of its spot with the faulty cell. This is made possible by the fact that the spots, assimilated to circular spots, do not stop at the edge of the generally hexagonal cell with which they are associated. It will also be noted that the method according to the invention is applied as much on an uplink from cells comprising terrestrial terminals towards the satellite (return link) as on a downlink from the satellite towards the cells comprising terrestrial terminals (forward link). It should also be mentioned that the method according to the invention is applicable without modification on board the satellite: the spots remain the same and advantageously the overflow of spots on contiguous cells to the cells with which they are associated is used.

The device according to the invention can likewise present one or more of the characteristics below, considered individually or according to all the combinations which are technically possible:

Advantageously, a plurality of spots each associated with a cell contiguous to the said faulty cell are each associated with a part of the said faulty cell.

According to a first variant, each of the said parts contributes to an equal covering area.

According to a second variant, at least two of the said parts contribute to a different covering area.

Advantageously, each spot presents an ascending or descending frequency band and a given polarisation direction, the spots presenting a same frequency band and a same polarisation direction being non-adjacent.

Preferentially, the said ascending or descending frequency bands belong to one of the following bands: Ka, Ku.

According to a first form of embodiment, the terrestrial terminals of the said faulty cell are suited to emit and/or receive signals in the two polarisation directions so that the whole of the spots associated with the contiguous cells to the said faulty cell can be associated with a part of the said faulty cell. The polarisation direction of emission and of reception is, in general, opposite.

According to a second form of embodiment, the terrestrial terminals of the said faulty cell are suited to emit and/or receive signals in a single polarisation direction so that only the spots associated with the cells contiguous to the said faulty cell and presenting the same polarisation direction as the faulty spot can be associated with a part of the said faulty cell.

In a particularly advantageous manner, the said radiofrequency links are established between a plurality of terrestrial stations and the said service area so that, for a first spot allocated to a first terrestrial station, the whole of the spots adjacent to the said first spot are each allocated to a different terrestrial station from the said first terrestrial station.

Preferentially, the said loss of a spot occurs as a result of one of the following failures:
- failure of a terrestrial station;
- failure of an antenna of the said multispot satellite;
- failure of a component of the transponder of the said multispot satellite.

BRIEF DESCRIPTION OF THE DRAWINGS

Other characteristics and advantages of the invention will become clearly apparent from the description given below, by way of indication and in no way in a restrictive manner, with reference to the attached figures, in which:

FIG. 1 is a simplified diagrammatic representation of a multispot configuration;

FIG. 2a) represents an example of covering zone composed of a plurality of disjointed hexagons;

FIG. 2b) represents an approximation of the covering zone of FIG. 2a) composed of a plurality of circular spots;

FIGS. 3a) and 3b) take up again the illustration of FIGS. 2a) and 2b) with a scheme having four colors;

FIG. 4 illustrates a scheme with four colors for the coverage of Europe;

FIGS. 9a) and b) illustrate the implementation of the method according to a first form of embodiment of the invention;

FIGS. 10a) and b) illustrate the implementation of the method according to a second form of embodiment of the invention;

DETAILED DESCRIPTION

In all the figures, the common elements bear the same reference numbers.

FIG. 6 takes up again the illustration of FIG. 3b) in the case of loss of the yellow spots. Such a situation may occur for example in the case of failure of the reflector of the antenna of the satellite in charge of the generation of the yellow spots. This type of breakdown involves the loss of a quarter of the spots. As we have already mentioned above, the lost cells CPJ associated with the yellow spots are each surrounded by six contiguous cells, none of which is a cell associated with a yellow spot (two cells associated with a green spot, two cells associated with a blue spot and two cells associated with a red spot).

The method according to the invention allows the loss of coverage engendered by these lost cells to be reduced.

Figure 6:
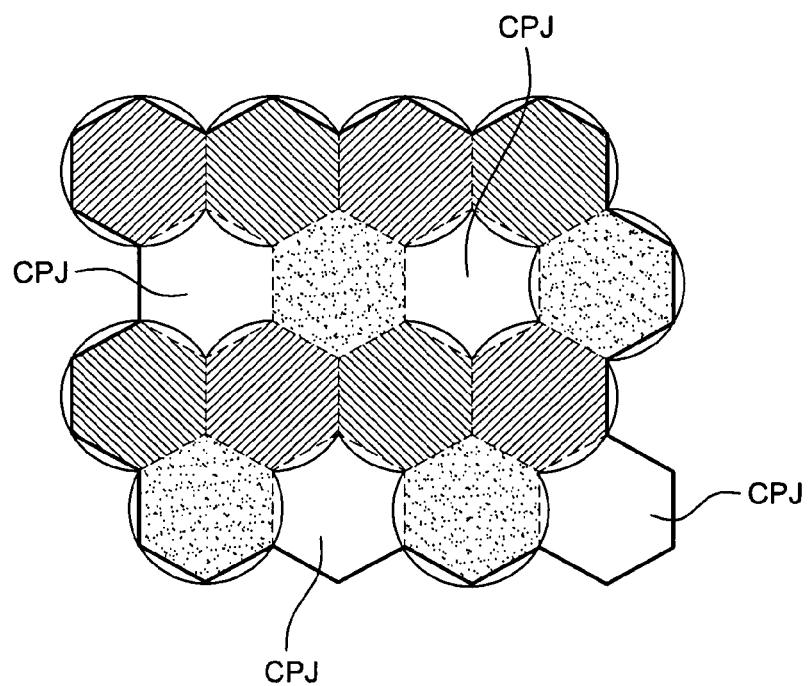
FIG. 6 takes up again the illustration of FIG. 3b) in the case of loss of the yellow spots.
Figure 7:
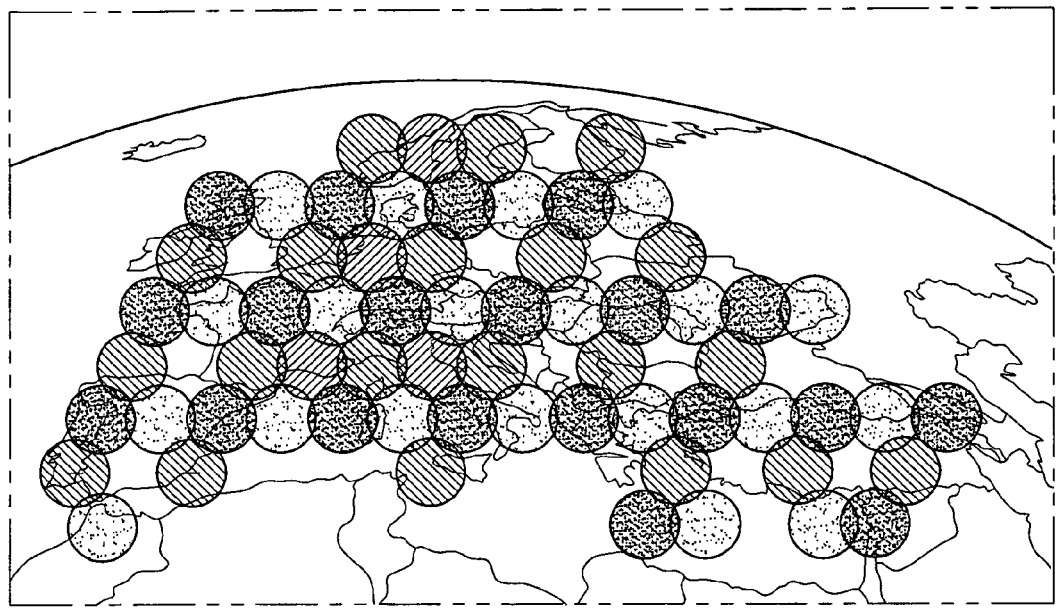
FIG. 7 takes up again FIG. 4 in the case of failure of a terrestrial station.

A first form of embodiment of the method according to the invention is illustrated in FIGS. 9a) and 9b). As we have already mentioned above, an antenna spot associated with a cell is not capable of producing a hexagonal shape, a good approximation consisting in considering a circular spot. A cell is determined as the part of the service area associated with the spot offering the highest gain on this zone from all the spots of the satellite. However, the spots do not stop at the edges of the cell: the method according to the invention advantageously uses the overflowing of each spot on the contiguous cells to the cell with which it is associated. As in FIG. 6, all the yellow spots are faulty so that the cells associated with the yellow spots are not covered: these cells are designated as faulty cells. Due to the method according to the invention, the cells contiguous to the faulty cells are enlarged. As the spots of the same "color" are non-adjacent, the contiguous cells therefore correspond to different colors. The enlargement of a contiguous cell is understood to mean the fact of associating the spot associated with this contiguous cell with a part of the area of the faulty cell. The six spots (two red FR1 and FR2, two blue FB1 and FB2 and two green FV1 and FV2) associated respectively with the 6 cells CR1, CR2, CB1, CB2, CV1 and CV2 contiguous to the faulty cell are each associated with a part of the area of the hexagonal cell so that the non-covered area CPJ' is much less than the area of the faulty cell CPJ as represented in FIG. 6. Of course, the spots FR1, FR2, FB1, FB2, FV1 and FV2 also continue to be associated respectively with the cells CR1, CF2, CB1, CB2, CV1 and CV2. It will be noted that the size of the spots FR1, FR2, FB1, FB2, FV1 and FV2 does not increase, the enlargement of the spots represented in FIG. 9a) (i.e. the two concentric circles, one in dotted lines and the other in a solid line, showing respectively the spot used in functioning mode according to the prior art and the spot in functioning mode according to the method according to the invention) aiming solely to illustrate the fact that these latter are associated with a larger area: the size of the spots remains the same. Likewise, the frequency bands allocated to the spots remain the same: there is no reorganisation of the frequency bands, but in the faulty cell the frequency bands and the polarisations are defined according to the (geographical) sectors and the extension of the spots (i.e. the terminals situated in the faulty cell emit and receive in the frequency band associated with the new enlarged cell in which they are situated, but this does not imply any change of infrastructure). Of course, these spots are not optimised (by construction) to function with the faulty cell in terms of merit figure G/T and EIRP, but this is an emergency solution allowing a loss of the global area of the faulty cell to be mitigated: it will consequently be understood that the method according to the invention offers a solution in intermediate downgraded mode between the optimum solution with all the cells functioning and the solution with loss of spots without partial covering of the service area. Another way of describing the invention consists in considering that a part of the terrestrial terminals situated initially in the faulty cell are re-allocated to the cells contiguous to the faulty cell. By way of example, the terrestrial terminal T1 which belonged initially to the faulty cell belongs to the cell CV1; the cell CV1 is "enlarged" (i.e. the radiofrequency link is made on the spot FV1) to allow the coverage of the zone to which the terminal T1 initially belonged. Likewise, the terrestrial terminal T2 which belonged initially to the faulty cell belongs to the cell CV2: the cell CV2 is "enlarged" (i.e. the radiofrequency link is made on the spot FV2) to allow the coverage of the zone to which the terminal T2 belonged initially. FIG. 9b) represents the service area covered due to the method according to this first form of embodiment of the invention using the extension of the whole of the cells contiguous to the faulty cell.

It will be noted that the form of embodiment described with reference to FIGS. 9a) and 9b) originates from the hypothesis that the terrestrial terminals are suited to function on the two left and right circular polarisation directions (or horizontal and vertical, as the case may be). A second form of embodiment of the method according to the invention is illustrated with reference to FIGS. 10a) and b) in the case of terrestrial terminals performing less well only functioning in one polarisation direction. The color yellow of the spot associated with the faulty cell has a circular right polarisation direction. In this case, only the cells CR1' and CR2' associated with the red spots FR1' and FR2', the polarisation direction of which is likewise circular right, are enlarged; in other words, the spots of the same polarisation as the spot associated with the faulty cell are each associated with a part of the faulty cell so as to obtain a non-covered area CPJ" reduced in relation to the area of the faulty cell CPJ (the area CPJ" is clearly greater than the area CPJ'). FIG. 10b) represents the service area covered due to the method according to this second form of embodiment of the invention using the extension of the cells contiguous to the faulty cell and presenting a polarisation of the same direction as the faulty cell.

Figure 5:
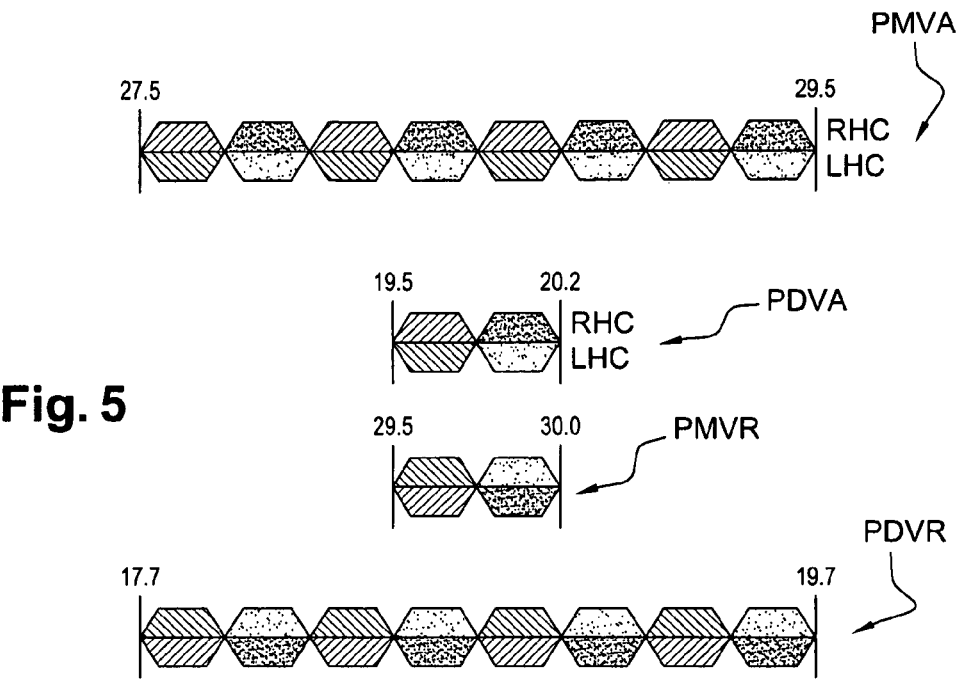
FIG. 5 illustrates a frequency plan in band Ka.

The method according to the invention is applicable both on an uplink from cells comprising terrestrial terminals towards the satellite (return link) as on a downlink of the satellite towards the cells comprising terrestrial terminals (forward link). The scheme with four colors is symmetrical between the forward link and the return link. A cell is of the same color in reception and in transmission. On the other hand, this color does not correspond to the same frequency in forward link (reception of the signal emitted by the satellite between 19.7 and 20.2 GHz) and in return link (emission in the direction of the satellite between 29.5 and 30.0 GHz). In addition, the polarisation is inverted between the emitted signal and the received signal, which allows the use of simpler and less costly terminals, the separation between transmitted signal and received signal being by polarisation and not necessitating specific filtering. Taking up again the frequency plan of FIG. 5, this inversion of polarisation is readily seen, and the frequency difference, for the same color between the forward link and the return link. The method is therefore applicable in the same way in forward link and in return link, since a cell will interface with a single terrestrial station for the forward link (reception by the terminals of the cell of the signals sent by the terrestrial station via the satellite) and for the return link (transmission of the signals by the terminal towards the terrestrial station via the satellite). In the case of failure of a terrestrial station, or else in the case of failure of a satellite antenna, one then loses the capacity of the cells connected to this terrestrial station and respectively the capacity of the cells connected to the ground segment via this antenna, both in forward link and in return link. A failure of a satellite amplifier will be able to only affect the forward link or the return link, according to whether this amplifier is used for the forward link or for the return link.

Figure 8:
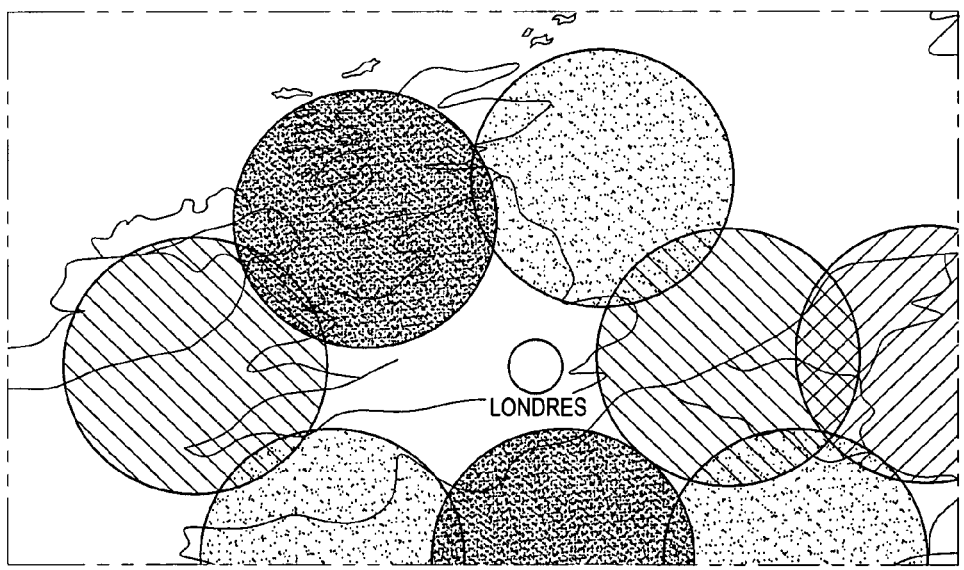
FIG. 8 is an enlargement of FIG. 7 at the level of Great Britain.
Figure 11:
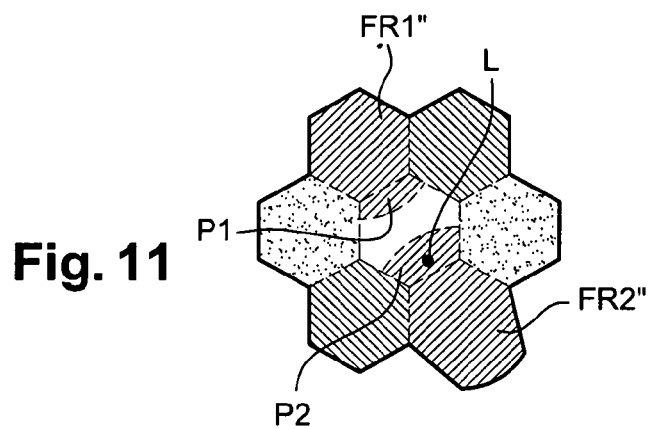
FIG. 11 illustrates the implementation of the method according to a third form of embodiment of the invention.
Figure 12:
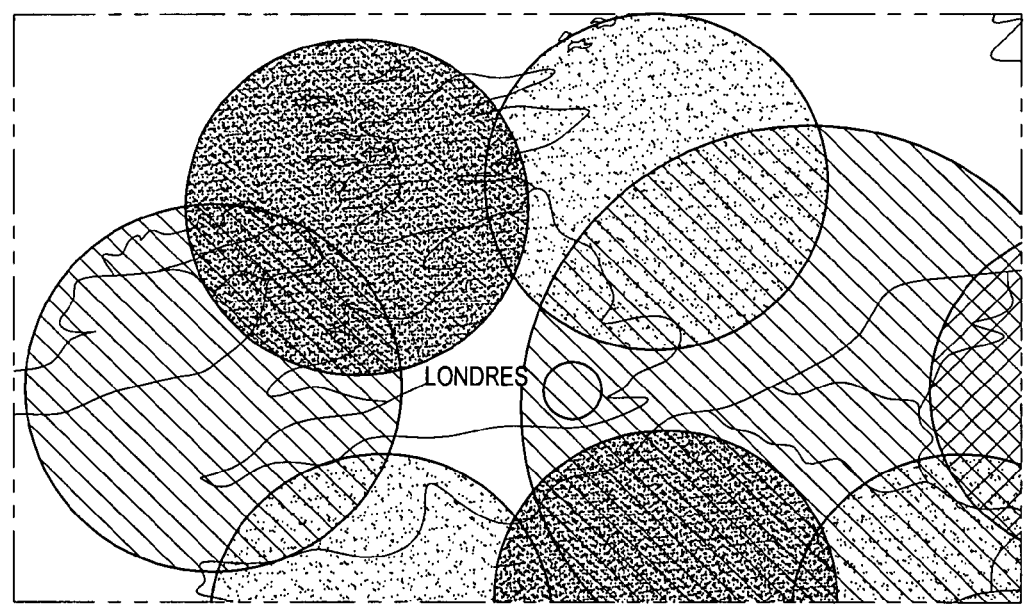
FIG. 12 illustrates the implementation of the third form of embodiment of the invention in the situation represented in FIG. 8.

It will be noted that the parts of the faulty cell re-allocated to another adjacent spot, both on FIGS. 9a) and 9b) and on FIGS. 10a) and 10b), have the same area. However, one can likewise apply the method according to the invention by increasing in a different way the areas of the lost cell as a function of the resource requirements which are not necessarily distributed in a homogeneous manner on the lost area. FIG. 11 illustrates this form of embodiment. It is found that the part P1 associated with the red spot FR1" presents a smaller area than the area of the part P2 associated with the red spot FR2". Such an implementation of the method according to the invention can prove to be particularly useful when one wishes to retrieve a functioning on a part including a site of interest L. An example of the use of this form of embodiment is illustrated in FIG. 12, in which one sees a blue spot associated with a larger part than the others of the lost cell, said part including London city: the method according to this third form of embodiment therefore allows certain important cities to be covered contrary to what was illustrated with reference to FIG. 8 for which the London area was lost.

The enlarging of the cells implies that the terrestrial stations must manage an extension of the number of terrestrial terminals with which they must communicate. This is possible in the case of a centralised management of the addresses of MAC type (media access control) or IP type (internet protocol) of the terminals. This centralised management allows all the terrestrial stations, in real time, as it were, to know which are the terminals which are attached to them, and to take up again their control in the case of failure. Another solution can consist in giving to the terrestrial terminals an address in normal functioning mode connecting them to their reference terrestrial station and an "emergency" address (in the case of failure of the spot to which they are attached), connecting them to an emergency terrestrial station, the reconfiguration thus becoming very rapid.

The method according to the invention finds a particularly interesting application in the case of the failure of a gateway (called also terrestrial station) involving the loss of all of the spots generated from the gateway (in the example cited above with reference to the prior art, 16 spots being lost). In this case, the data transmission network by satellite is constructed so that for a first spot assigned to a first gateway, the whole of the spots adjacent to the said first spot are each assigned to a different gateway from this gateway. In other words, if a spot is "served" by gateway, the spots surrounding this spot are necessarily served by another gateway. Such a configuration, in the case of failure of a terrestrial station, allows there to always be available spots adjacent to the lost spot issued from the faulty terrestrial station; the implementation of the method according to the invention is therefore still possible since one still has available spots associated with the cells contiguous to the lost cell. It will be noted that such an architecture is particularly original in so far as the spots served by the same gateway are not regrouped geographically but are, on the contrary, voluntarily distanced so as to be able to implement the method according to the invention.

Of course, the invention is not limited to the form of embodiment which has just been described.

In particular, the invention has been described more particularly in the case of a scheme having four colors, but it can be applied to another number of colors (two, for example).

Furthermore, we have described more specifically the case of losses of spots connected with a color or of an entirety of spots served by the same terrestrial station, but the method according to the invention is applicable equally in the case of other failures inducing the loss of spots (poor functioning of a multiplexer or of a filter, failure of a high power amplifier HPA or failure of the power system on the satellite).

The invention claimed is:

1. A method for establishing radiofrequency links via a telecommunication satellite having several spots, designated a multispot satellite, between at least one terrestrial station and a service area composed of a plurality of elementary covering zones, designated as cells, each cell comprising a plurality of terrestrial terminals, said method comprising:
    associating each of the cells with a spot to which a frequency band is allocated; and
    associating, in case of loss of a spot associated with a first cell of the cells, designated a faulty cell, without modification on board of the satellite, a spot associated with at least one cell contiguous to said faulty cell with a part of the said faulty cell so that an area of said faulty cell is reduced, the associating of the spot associated with the at least one cell contiguous to said faulty cell being performed terrestrially.

2. The method according to claim 1 wherein a plurality of spots each associated with a contiguous cell to said faulty cell are each associated with a part of the said faulty cell.

3. The method according to claim 2 wherein each of the said parts contributes to a covering area.

4. The method according to claim 2 wherein at least two of the said parts contribute to a different covering area.

5. The method according to claim 1 wherein each spot presents a given ascending or descending frequency band and a given polarisation direction, the spots presenting a same frequency band and a same polarisation direction being non-adjacent.

6. The method according to claim 5 wherein the said ascending or descending frequency bands belong to one of the following bands: Ka, Ku.

7. The method according to claim 5 wherein first terrestrial terminals of the faulty cell are suited to emit and/or receive signals in two polarisation directions so that the whole of the spots associated with the contiguous cells to the faulty cell can be associated with part of the faulty cell.

8. The method according to claim 5 wherein first terrestrial terminals of the said faulty cell are suited to emit and/or receive signals in a single polarisation direction so that only the spots associated with the contiguous cells to the faulty cell and presenting the same polarisation direction as the faulty spot can be associated with part of the said faulty cell.

9. The method according to claim 1 wherein the radiofrequency links are established between a plurality of terrestrial stations and the service area so that, for a first spot allocated to a first terrestrial station, the whole of the adjacent spots to the said first spot are each allocated to a different terrestrial station from the said first terrestrial station.

10. The method according to claim 1 wherein the loss of the spot occurs as a result of one of the following failures: failure of a terrestrial station; failure of an antenna of the said multispot satellite; and failure of a component of a transponder of the said multispot satellite.

11. The method according to claim 1 wherein the associating of the spot associated with the at least one cell contiguous to said faulty cell is performed by at least one terrestrial station communicating with the at least one cell contiguous to said faulty cell.

12. The method according to claim 1 wherein the associating of the spot associated with the at least one cell contiguous to said faulty cell is performed by terrestrial terminals of said faulty cell within the spot associated with the at least one cell contiguous to said faulty cell.

13. The method according to claim 1 wherein the associating of the spot associated with the least one cell contiguous to said faulty cell includes re-allocating terrestrial terminals of said faulty cell to the spot associated with the at least one cell contiguous to the faulty cell without increasing the size or location of the spot associated with the least one cell contiguous to said faulty cell.

* * * * *